United States Patent
Zhuang et al.

(10) Patent No.: US 12,067,456 B2
(45) Date of Patent: Aug. 20, 2024

(54) ENTANGLEMENT-ENHANCED MACHINE LEARNING WITH QUANTUM DATA ACQUISITION

(71) Applicant: Arizona Board of Regents on Behalf of the University of Arizona, Tucson, AZ (US)

(72) Inventors: Quntao Zhuang, Tucson, AZ (US); Zheshen Zhang, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 945 days.

(21) Appl. No.: 16/953,270

(22) Filed: Nov. 19, 2020

(65) Prior Publication Data
US 2021/0150401 A1    May 20, 2021

Related U.S. Application Data (60) Provisional application No. 62/938,617, filed on Nov. 21, 2019, provisional application No. 62/937,370, filed on Nov. 19, 2019.

(51) Int. Cl.
G06N 10/20    (2022.01)
G06N 10/00    (2022.01)
G06N 20/00    (2019.01)

(52) U.S. Cl.
CPC .............. *G06N 10/00* (2019.01); *G06N 20/00* (2019.01)

(58) Field of Classification Search
CPC ........ G06N 10/00; G06N 10/02; G06N 10/40; G06N 10/60; G06N 10/70; G06N 10/80; G06N 20/10
See application file for complete search history.

(56) References Cited

U.S. PATENT DOCUMENTS

2017/0026175 A1*  1/2017  Zhang ................... H04L 9/0852
2020/0327440 A1* 10/2020  Cao ........................ G06N 20/00
(Continued)

OTHER PUBLICATIONS

Xia et al., "Repeater-enhanced distributed quantum sensing based on continuous-variable multipartite entanglement", Jan. 2019, American Physical Society, Ed. 99, pp. 1-9 (Year: 2019).*

(Continued)

*Primary Examiner* — Paulinho E Smith
(74) *Attorney, Agent, or Firm* — Cozen O'Connor (57) ABSTRACT

A system for entanglement-enhanced machine learning with quantum data acquisition includes a first variational circuit that generates a plurality of entangled probe light fields that interacts with a sample and is then processed by a second variational quantum circuit to produce at least one detection light field, a detector is used to measure a property of the at least one detection light field, and the first and second variational quantum circuits are optimized though machine learning. A method for entanglement-enhanced machine learning with quantum data acquisition includes optimizing a setting of a first and second variational quantum circuits, which includes probing a training-set with a plurality of entangled probe light fields generated by the first variational quantum circuit, and measuring a phase property of at least one detection light fields generated by the second variational quantum circuit from the plurality of entangled probe light fields after interaction with the training-set.

21 Claims, 7 Drawing Sheets

(56) References Cited

U.S. PATENT DOCUMENTS

| | | | |
|---|---|---|---|
| 2020/0349457 A1* | 11/2020 | Low | G06N 10/00 |
| 2020/0372334 A1* | 11/2020 | Carolan | G06N 3/088 |
| 2021/0065037 A1* | 3/2021 | Wiebe | G06N 5/022 |
| 2021/0133614 A1* | 5/2021 | Ashrafi | G06N 10/00 |
| 2023/0221616 A1* | 7/2023 | Zhang | G02F 1/3536 |
| | | | 385/14 |

OTHER PUBLICATIONS

Cui et al., "Wave-Function Engineering for Spectrally Uncorrelated Biphotons in the Telecommunication Band Based on a Machine-Learning Framework", Sep. 2019, American Physical Society, Ed. 99, pp. 1-12 (Year: 2019).*

Wunderlich et al., "Quantum Measurements and New Concepts for Experiments with Trapped Ions", Nov. 25, 2002, ArXiv, pp. 1-69 (Year: 2002).*

Biamonte, J. et al., "Quantum Machine Learning", arXiv:1611.09347v2 [quant-ph], 1-24 (May 10, 2018).

Dunjko, V. et al., "Machine learning & artificial intelligence in the quantum domain", arXiv:1709.02779v1 [quant-ph], 1-105 (Sep. 8, 2017).

Ge, W. et al., "Distributed Quantum Metrology with Linear Networks and Separable Inputs", Phys Rev. Lett., 121(4): 1-12 (Jul. 27, 2018).

Guo, X. et al., "Distributed quantum sensing in a continuous variable entangled network", arXiv:1905.09408v2 [quant-ph], 1-16 (Sep. 2, 2019).

Havlicek, V. et al., "Supervised learning with quantum enhanced feature spaces", arXiv:1804.11326v2 [quant-ph], 1-22 (5 Jun. 3, 2018).

Killoran, N. et al., "Continuous-variable quantum neural networks", arXiv:1806.06871v1 [quant-ph], 1-21 (Jun. 18, 2018).

Proctor, T. et al., "Multi-parameter estimation in networked quantum sensors", arXiv:1707.06252v2 [quant-ph], 1-11 (Dec. 4, 2017).

Rebentrost, P. et al., "Quantum support vector machine for big data classification", arXiv:1307.0471v3 [quant-ph], 1-5 (Jul. 10, 2014).

Schuld, M. et al., "Quantum machine learning in feature Hillbert spaces", arXiv.1803.07128v1 [quant-ph], 1-12 (Mar. 19, 2018).

Xia, Y. et al., "Repeater-enhanced distributed quantum sensing based on continuous-variable multipartite entanglement", arXiv:1810.09095 [quant-ph], 1-9 (Oct. 22, 2018).

Zhuang, Q. et al., "Distributed quantum sensing using continuous-variable multipartite entanglement", arXiv:1711.10459 [quant-ph], 1-7 (Mar. 27, 2018).

* cited by examiner

```
┌─────────────────────────────────────────────────────────────────────────┐
│ ITERATIVELY ADJUSTING SETTING OF FIRST AND SECOND VARIATIONAL QUANTUM    │
│ CIRCUITS TO OPTIMIZE A HYPERPLANE, DEFINED BY THE SETTING, SUCH THAT     │
│ THE HYPERPLANE OPTIMALLY CLASSIFIES A TRAINING SET OF SAMPLES            │
│ 710                                                                      │
└─────────────────────────────────────────────────────────────────────────┘
```

PROBE THE TRAINING SAMPLES WITH ENTANGLED PROBE LIGHT FIELDS GENERATED BY THE FIRST QUANTUM CIRCUIT
712

MEASURE A PROPERTY OF A SINGLE DETECTION LIGHT FIELD GENERATED BY THE SECOND VARIATIONAL QUANTUM CIRCUIT FROM THE ENTANGLED PROBE LIGHT FIELDS AS AFFECTED BY INTERACTION WITH THE TRAINING-SET OF SAMPLES
714

CLASSIFY SAMPLE BASED UPON THE PROPERTY
716

OPTIMIZE BEAM-SPLITTER RATIOS AND PHASE SHIFTS IMPOSED BY THE FIRST AND SECOND VARIATIONAL QUANTUM CIRCUITS
616

MINIMIZE COST FUNCTION
718

UTILIZE THE OPTIMIZED FIRST AND SECOND VARIATIONAL CIRCUITS TO CLASSIFY OTHER SAMPLES
720

PROBE SAMPLE WITH ENTANGLED PROBE LIGHT FIELDS
712

MEASURE PROPERTY OF THE SINGLE DETECTION LIGHT FIELD
714

CLASSIFY SAMPLE BASED UPON THE PROPERTY
716

ENTANGLEMENT-ENHANCED MACHINE LEARNING WITH QUANTUM DATA ACQUISITION

RELATED APPLICATIONS

This application claims priority to U.S. Provisional Patent Application No. 62/937,370, filed Nov. 19, 2019, and U.S. Provisional Patent Application No. 62/938,617, filed Nov. 21, 2019, each of which is incorporated herein by reference in its entirety.

BACKGROUND

In machine learning, a machine, typically a computer, learns how to perform a certain task without using explicit instructions. The machine is trained on a training dataset and, after having been trained, the machine is capable of performing the task on new data. Supervised learning refers to the machine-learning task of learning, or optimizing, a function that maps an input (X) to an output (Y) based on example input-output pairs. Each input-output pair consists of an input sample and a corresponding desired output. During a training stage, a supervised learning algorithm analyzes a training dataset to learn the function, such that the output of the algorithm optimally agrees with the desired output, whereafter the function is ready for use in a utilization state for mapping new examples. Unsupervised learning is similar to supervised learning, except that the training stage does not utilize a priori knowledge about outputs (Y). An unsupervised learning algorithm draws inferences from the training dataset of inputs, and parameters of the unsupervised learning algorithm are optimized to maximize an objective function.

Quantum machine learning typically refers to a quantum-enhanced form of machine learning, wherein data is obtained classically and then subsequently processed by a quantum computer. The data acquisition process is still purely classical. However, the computational process to solve the corresponding optimization problem benefits from the greater computational efficiency of the quantum computer, as compared to a classical computer.

A support-vector machine (SVM) is a supervised learning model used to solve classification tasks, that is, the classification of samples into two different classes. The SVM determines a hyperplane that divides the possible sample space in two. A training stage applies the SVM to a training dataset in order to optimize the hyperplane to optimally classify samples of the training dataset. When the training stage is completed, the SVM may be used to classify actual samples. In some scenarios, the SVM may be capable of classifying samples that are different from those encountered by the SVM during the training stage.

Principal-component analysis (PCA) transforms a set of observations of possibly correlated variables into a set of values of linearly uncorrelated variables termed "principal components". Each principal component is a vector, and the principal components form an orthogonal basis set. The transformation exerted by the PCA is defined such that the first principal component has the largest possible variance (i.e., accounts for the highest amount of variability in the data), and each succeeding component in turn has the highest variance possible under the constraint that it is orthogonal to the preceding components. PCA may be used to reduce the dimensionality of a problem by considering only a most significant subset of the principal components. Thus, PCA may be used in data compression. The principal components may be determined in a training stage, with a controlled sample set, and then subsequently utilized to process other samples. PCA may be utilized in unsupervised learning problems.

SUMMARY OF THE EMBODIMENTS

A system for entanglement-enhanced machine learning with quantum data acquisition includes a first variational quantum circuit for generating a plurality of entangled probe light fields that interact with a sample; a second variational quantum circuit for processing the plurality of entangled probe light fields, after having interacted with the sample, to produce at least one detection light field; and at least one detector for measuring a property of the at least one detection light field; the first and second variational quantum circuits having a setting that is optimizable through machine learning to optimally acquire data about the sample.

A method for entanglement-enhanced machine learning with quantum data acquisition includes optimizing a setting of a first and second variational quantum circuits for a data acquisition task, said optimizing includes probing a training-set of samples with a plurality of entangled probe light fields generated by the first variational quantum circuit; and measuring a phase property of at least one detection light field generated by the second variational quantum circuit from the plurality of entangled probe light fields as affected by interaction with the training-set of samples.

DETAILED DESCRIPTION OF THE EMBODIMENTS

Figure 1:
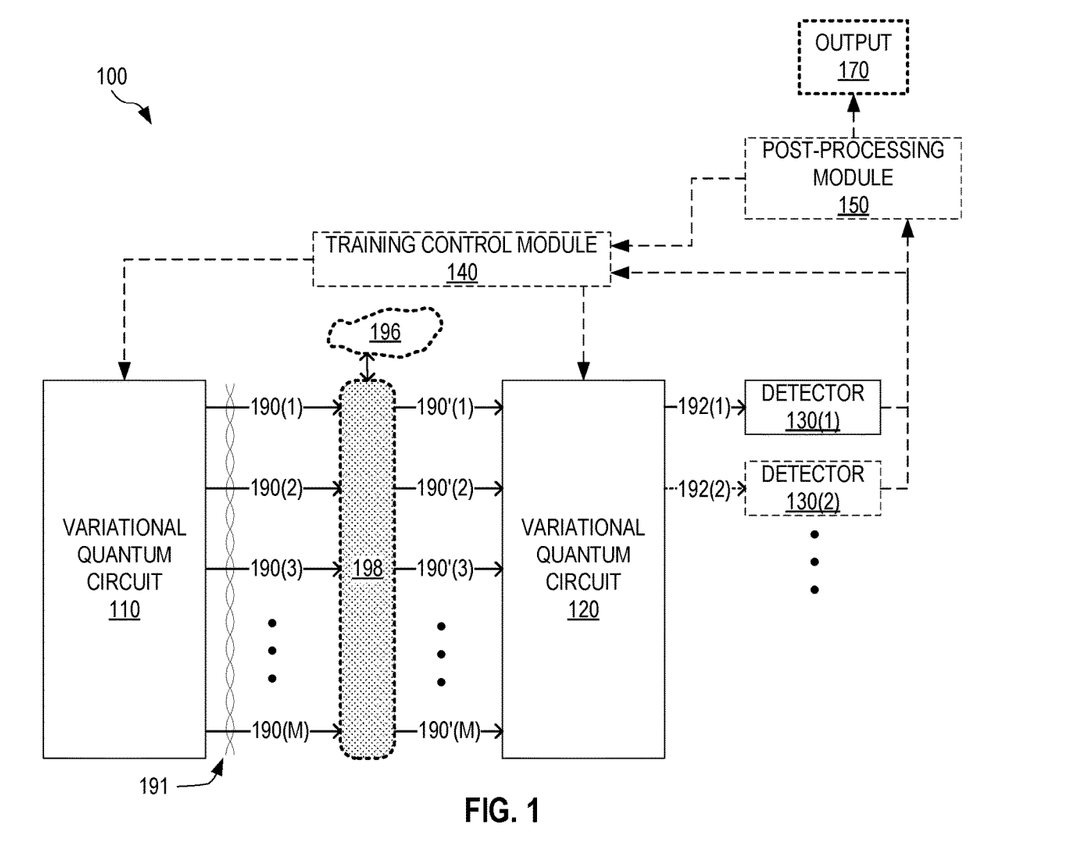
FIG. 1 illustrates a system for entanglement-enhanced machine learning with quantum data acquisition, according to an embodiment.

FIG. 1 illustrates one system 100 for entanglement-enhanced machine learning with quantum data acquisition. System 100 includes variational quantum circuits 110, 120 and at least one detector 130. Variational quantum circuit 110 generates a plurality of probe light fields 190($i$) in an entangled state 191, where i=1, ..., M and M is an integer greater than one. Probe light fields 190, directly or indirectly, interrogate a sample 196. The interrogation of sample 196 involves an interaction 198 between entangled probe light fields 190 and sample 196, which affects one or more properties of entangled probe light fields 190. In one embodiment, the affected property is field-quadrature of probe light fields 190. More generally, however, the interaction may affect displacements on canonical conjugate variables including time and frequency, angular momentum and angle, and number and phase. Variational quantum circuit 120 processes probe light fields 190'(i), i.e., probe light fields 190 as affected by interaction 198, to generate one or more detection light fields 192. Each detection light field 192 is detected by a respective detector 130.

Variational quantum circuits 110 and 120 are optical circuits and have a variable setting that may be tuned to optimally obtain desired information about samples 196. In one embodiment, each variational quantum circuit 110 and 120 includes a network of beam splitters and phase shifters, wherein at least some of the associated beam splitter ratios and phase shifts are adjustable.

System 100 may further include a training control module 140 that controls training of variational quantum circuits 110 and 120 to optimally obtain this desired information. During a training stage, training control module 140 adjusts the setting of variational quantum circuits 110 and 120 while probe light fields 190 interact with a training dataset of samples 196 and detector(s) 130 measures a property of each respective detection light field(s) 192. Training control module 140 evaluates the measured property, or another output derived therefrom, and optimizes the setting of variational quantum circuits 110 and 120 accordingly. This training process may be iterative. Once training control module 140 has completed the training, variational quantum circuits 110 and 120 are configured in the optimal setting, and system 100 is ready to proceed to a utilization stage where system 100 probes other samples 196 to obtain the desired information therefrom.

In addition, system 100 may include a post-processing module 150 that processes measurements by detector(s) 130 to determine an output 170. In one example, one detector 130 measures a quadrature displacement of corresponding detection light field 192, resulting from probe light fields 190 interacting with a sample 196, and post-processing module 150 derives, as an example of output 170, a classification of sample 196 from this quadrature displacement. During the training stage, training control module 140 may evaluate outputs 170 to determine the optimal setting of variational quantum circuits 110 and 120. During the utilization stage, post-processing module 150 may produce outputs 170 for a collection of samples 196 interrogated by probe light fields 190.

System 100 is significantly different from a conventional quantum-enhanced machine learning system that obtains measurements classically, encodes these classically obtained measurements in quantum memory, and processes the quantum-encoded measurements in a quantum computer to optimize parameters of an algorithm encoded in the quantum computer. In the case of system 100, training control module 140 may be a classical computer. However, system 100 benefits from at least two quantum advantages in the data acquisition process at the actual physical layer where measurements are done to probe samples: (1) Variational quantum circuits 110 and 120 are configured to use the plurality of local probe light fields 190 to measure a global property of each sample 196, which reduces error and obviates overhead otherwise associated with redundancy of direct measurement for each local probing of sample 196, and (2) since probe light fields 190 are entangled, the measurement of the global property benefits from entanglement enhanced sensitivity. Probe light fields 190 may operate in a non-local configuration and be emitted by respective light sources that are far apart from each other, e.g., hundreds of meters or several kilometers away from each other.

In system 100, probe light fields 190 may directly probe samples 196 by, for example, being transmitted through sample 196 or reflected by sample 196. In one example, each probe light field 190 propagates through a substrate or waveguide, and a sample 196 disposed at a surface of the substrate or waveguide interacts with an evanescent wave of each probe light field 190 to phase shift probe light fields 190. However, in some scenarios, direct interrogation may not be feasible or even useful. Thus, in certain embodiments, system 100 is configured to indirectly probe sample 196 with light probe fields 190.

Figure 2:
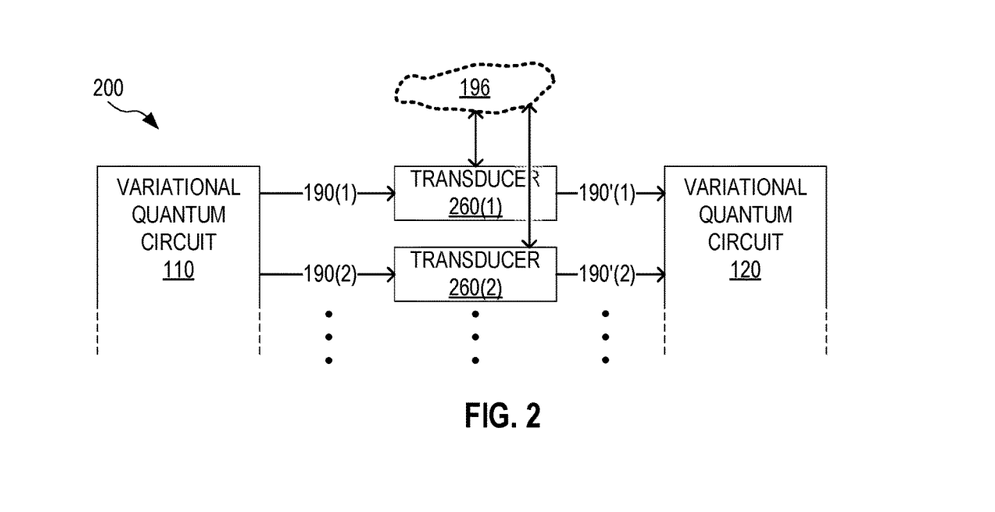
FIG. 2 illustrates a system for entanglement-enhanced machine learning with quantum data acquisition based on indirect probing of samples, according to an embodiment.

FIG. 2 illustrates one system 200 for entanglement-enhanced machine learning with quantum data acquisition based on indirect probing of samples. System 200 is an embodiment of system 100 that includes a transducer 260(i) for each probe light field 190(i). Each transducer 260(i) encodes information from sample 196 in corresponding probe light field 190(i). In one example, transducer 260 is an electro-optic device that converts a radio-frequency signal from sample 196 to a modulation of probe light field 190. In another example, transducer 260 is an acousto-optic device that converts a mechanical signal from sample 196 to a modulation of probe light field 190.

Figure 3:
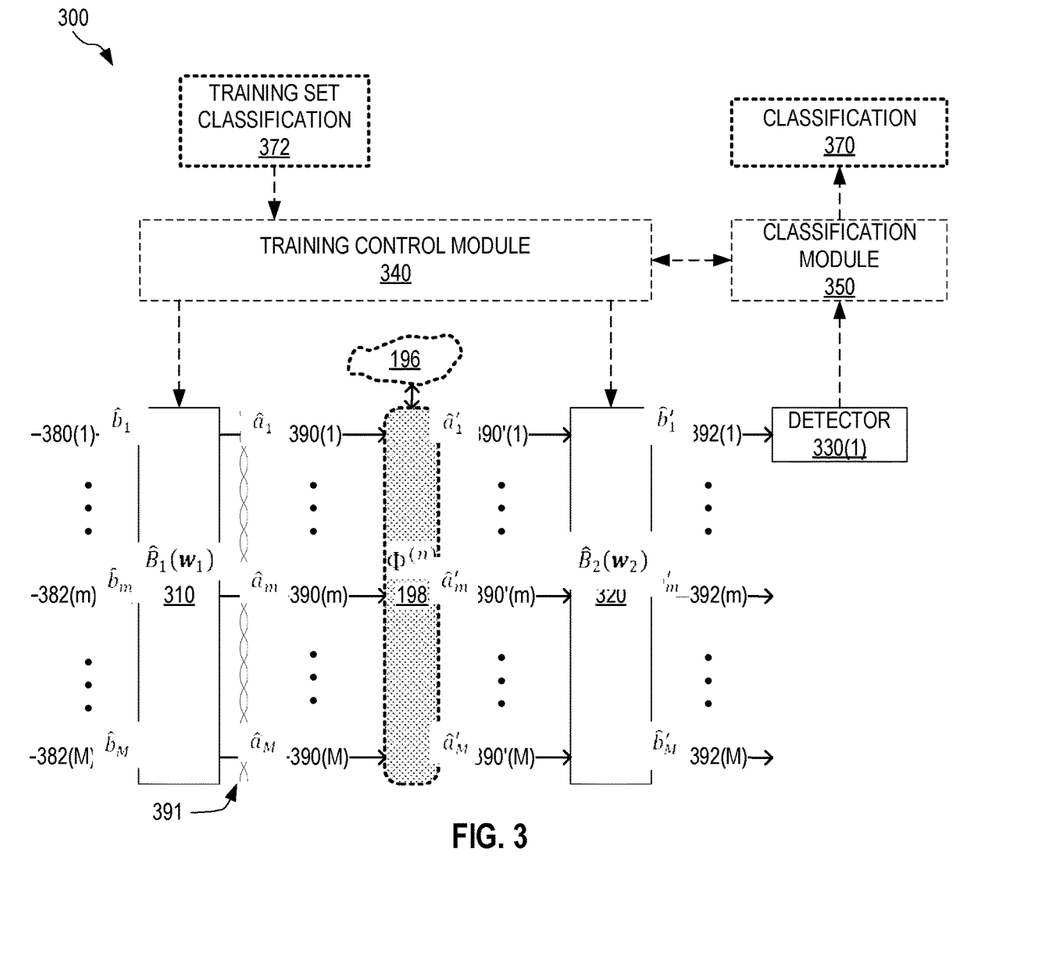
FIG. 3 illustrates an entanglement-enhanced support-vector machine with quantum data acquisition, according to an embodiment.

FIG. 3 illustrates one entanglement-enhanced support-vector machine (SVM) 300 with quantum data acquisition. SVM 300 is configured to classify samples. SVM 300 is an embodiment of system 100. SVM 300 includes variational quantum circuits 310 and 320, embodiments of variational quantum circuits 110 and 120, respectively. Variational quantum circuit 310 imposes a unitary operation $\hat{B}_1(w_1)$ on a resource-squeezed vacuum state 380(1) and a plurality of vacuum states 382(2), ..., 382(M) to generate a plurality of probe light fields 390(i), i=1, ..., M, in an entangled state 391, which is an embodiment of entangled state 191. M is an integer greater than one. Variational quantum circuit 320 imposes a unitary operation $\hat{B}_2(w_2)$ on probe light fields 390'(i), i=1, ..., M, i.e., probe light fields 390 as affected by interaction 198, to produce at least one detection light field 392. $w_1$ is a 1×M vector that is defined using the setting of variational quantum circuit 310 and $w_2$ is a 1×M vector defined using the setting of variational quantum circuit 320. Interaction 198 may be viewed as a quantum channel $\Phi^{(n)}$. Although not shown in FIG. 3, SVM 300 may include a transducer 260 in each probe light field 390.

$w_1$ defines a hyperplane such that $\hat{y}^{(n)} = \text{sign}(w_1 \cdot \alpha^{(n)} + b)$ is a class label that classifies each sample 196 interrogated by SVM 300. $\alpha^n$ is a vector of displacements imparted on probe light fields 390 by interaction 198, and b is a constant. In a classical data acquisition approach, all M entries of the displacement vector $\alpha^n$ would be measured to determine the class label. However, only the global property $w_1 \cdot \alpha^n$, as opposed to all M entries of the displacement vector $\alpha^n$, is needed to classify a sample. SVM 300 maximizes measurement efficiency by determining only the global property $w_1 \cdot \alpha^n$. SVM 300 further benefits from the entanglement of probe light fields 390 to gain quantum-enhanced measurement sensitivity.

In one embodiment, $w_1 = w_2 = w$ and $\hat{B}_1(w)$ is the Hermitian conjugate of $\hat{B}_2(w)$. In this embodiment, SVM 300 also includes a single detector 330(1) that detects a property of detection light field 392(1). Detector 330(1) is an example of detector 130(1). In one implementation of this embodiment, detector 330(1) is a homodyne detector. Variational quantum circuit 320 may further generate auxiliary output light fields 392(2), . . . , 392(M) that are not detected in this embodiment. In this embodiment, detector 330(1) outputs the global property $w \cdot \alpha'' = w_1 \cdot \alpha''$. This global property $w \cdot \alpha''$ may be processed classically to derive $\hat{y}^{(n)}$ therefrom.

In another embodiment, $\hat{B}_1(w_1)$ is different from the Hermitian conjugate of $\hat{B}_2(w_2)$ and $w_1$ may be different from $w_2$. In this embodiment, SVM 300 also has a plurality of detectors 330(i), at least two detectors 330(1) and 330(2), that detect a property of detection light fields 392(i), respectively. Each detector 330(i) is an example of detector 130(i). In one implementation of this embodiment, each detector 330(i) is a homodyne detector. In this embodiment, variational quantum circuit 320 may further generate auxiliary output light fields 392, such as auxiliary output light fields 392(3), . . . , 392(M), that are not detected in this embodiment. In this embodiment, no single one of detectors 330(i) outputs the global property $w_1 \cdot \alpha''$. However, the outputs of detectors 330(i) may be processed collectively (for example in classical post-processing) to determine $w_1 \cdot \alpha''$ and derive $\hat{y}^{(n)}$ therefrom.

In an embodiment, SVM 300 further includes a classification module 350 and a training control module 340, embodiments of post-processing module 150 and training control module 140, respectively. Classification module 350 classically derives $\hat{y}^{(n)}$ from the output(s) of detector(s) 330. Training control module 340 controls a supervised learning process for variational quantum circuits 310 and 320 to optimize $w_1$ and $w_2$ through optimizing the setting of variational quantum circuits 310 and 320. The training further optimizes the parameter b in classical post-processing by classification module 350. During the training stage, training control module 340 exposes probe light fields 390 to a training sample set having known classification, as specified by a training set classification 372. Training control module 340 compares the training set classification 372 to a measurement-derived classification 370 and minimizes a cost function that depends on w and b. Classification 370 is an embodiment of output 170.

Each of variational quantum circuits 310 and 320 may be implemented as a network of beam splitters and phase shifters. In one implementation, each of variational quantum circuits 310 and 320 is a network of beam splitters and phase shifters as disclosed by Clements et al. in "Optimal design for universal multiport interferometers", Optica, Vol. 3, No. 12, 2016, pp. 1460-1465, which is incorporated herein by reference in its entirety.

Without departing from the scope hereof, SVM 300 may define a plurality of hyperplanes for classification of a sample 196 with respect to each of these hyperplanes. In such multi-hyperplane embodiments, (a) the setting of variational quantum circuit 310 encodes a plurality of vectors $w_j$, each vector $w_j$ defining the j'th hyperplane, and (b) variational quantum circuit 310 receives a plurality of resource-squeezed vacuum state 380(i), one resource-squeezed vacuum state 380(i) for each hyperplane. In one multi-hyperplane embodiment of SVM 300, (a) variational quantum circuit 320 outputs one detection light field 392(i) for each hyperplane, and (b) for each hyperplane, a corresponding detector 330(i) outputs the global property $w_j \cdot \alpha''$. In another multi-hyperplane embodiment of SVM 300, (a) variational quantum circuit 320 outputs a plurality of detection light fields 392(i) that are detected by a respective plurality of detectors 330(i), and (b) the outputs of detectors 330 may be processed classically to determine $w_j \cdot \alpha''$ for each hyperplane and subsequently derive a plurality of class labels $\hat{y}_j^{(n)}$ respectively classifying sample 196 with respect to the j'th hyperplane.

Figure 4:
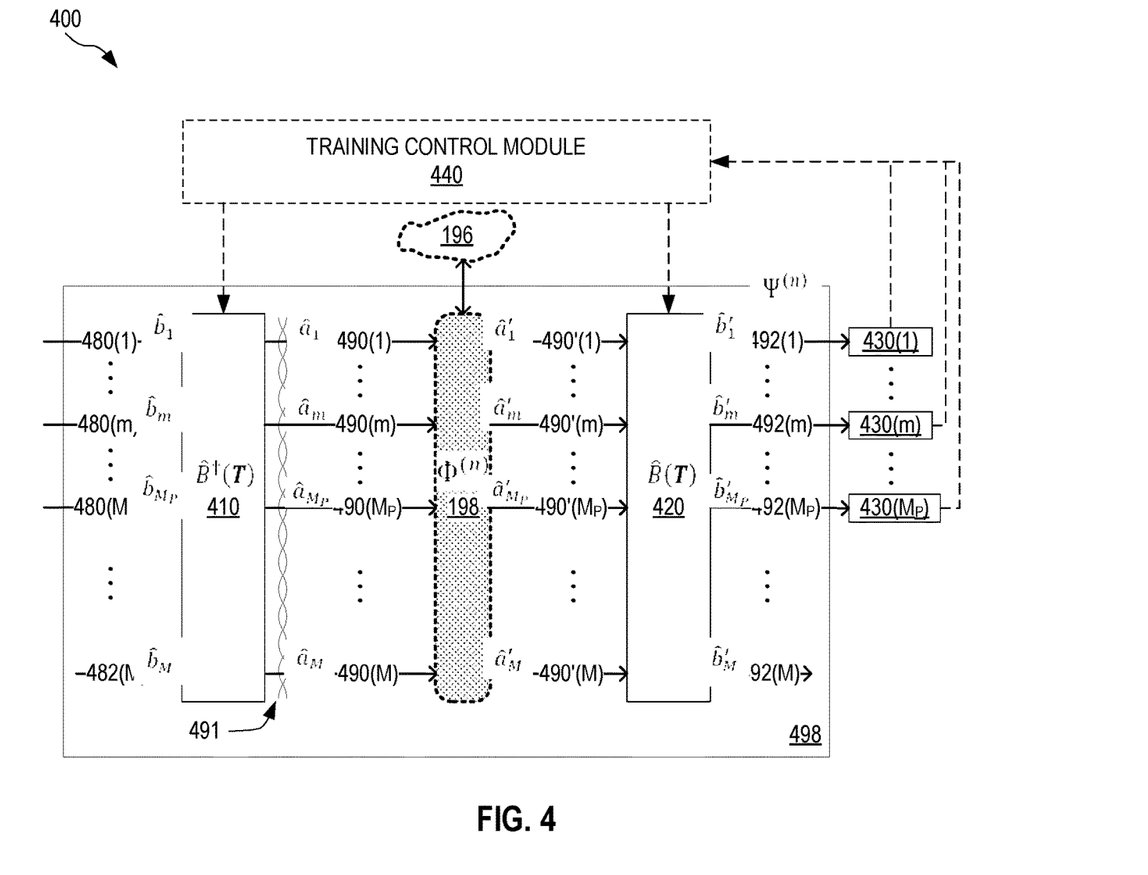
FIG. 4 illustrates an entanglement-enhanced principal component analyzer with quantum data acquisition, according to an embodiment.

FIG. 4 illustrates one entanglement-enhanced principal component analyzer (PCA) 400 with quantum data acquisition. PCA 400 is configured to reduce dimensionality of an M-dimensional quantum channel to $M_P$ principal components. $M_P$ is an integer greater than or equal to two. M is an integer greater than M. PCA 400 is an embodiment of system 100. PCA 400 includes variational quantum circuits 410 and 420, embodiments of variational quantum circuits 110 and 120, respectively. Variational quantum circuit 410 imposes a unitary operation $\hat{B}^\dagger(T)$ on a plurality of resource-squeezed vacuum states 480(1), . . . 480($M_P$) and a plurality of vacuum states 482($M_P$+1), . . . , 482(M) to generate a plurality of probe light fields 490(i), i=1, . . . , M, in an entangled state 491, which is an embodiment of entangled state 191. Variational quantum circuit 420 imposes a unitary operation $\hat{B}(T)$ on probe light fields 490', i.e., probe light fields 490 as affected by interaction 198, to produce $M_P$ detection light fields 492(1), . . . , 492($M_P$). In an embodiment, $\hat{B}^\dagger(T)$ is the Hermitian conjugate of $\hat{B}(T)$, and T is a transformation defined by variational quantum circuits 410 and 420.

PCA 400 also includes $M_P$ detectors 430(1), . . . 430($M_P$) that detect a property of detection light fields 492(1), . . . , 492($M_P$), respectively. Each detector 430(i) is an embodiment of detector 130(i). In one implementation, each detector 430(i) is a homodyne detector. Variational quantum circuit 420 may further generate auxiliary output light fields 492($M_P$+1), . . . , 492(M) that are not detected. Although not shown in FIG. 4A, PCA 400 may include a transducer 260 in each probe light field 490.

As is the case in SVM 300, interaction 198 may be viewed as a quantum channel $\Phi^{(n)}$. After having been trained, PCA 400 determines the $M_P$ principal components of quantum channel $\Phi^{(n)}$, thereby effectively reducing the M-dimensional quantum channel $\Phi^{(n)}$ to an $M_P$-dimensional quantum channel $\Psi^{(n)}$ (labeled 498 in FIG. 4). PCA 400 achieves principal component analysis and associated dimensionality reduction directly in the physical layer, and further benefits from quantum-enhanced measurement sensitivity by virtue of probe light fields 490 being in entangled state 491.

In an embodiment, PCA 400 further includes a training control module 440, an embodiment of training control module 140. From measurements obtained by detectors 430, training control module 440 determines a joint measurement outcome $f_T(\Phi^{(n)})$ that is an $M_P$-dimensional vector. Training control module 440 controls an unsupervised learning process for variational quantum circuits 410 and 420 to optimize T through optimizing the setting of variational quantum circuits 410 and 420. During the training stage, training control module 440 exposes probe light fields 490 to a training sample set and tunes T to maximize $\|f_T(\Phi^{(n)})\|^2$.

As discussed in further detail in Appendix I, one embodiment of variational quantum circuit 420 includes $M_P$ sequential sub-circuits configured to impose respective unitary transformations $\hat{B}(T_m)$, m=1, . . . , $M_P$. A first one of these sub-circuits generates light fields $\hat{b}_1', \hat{c}_2', \ldots \hat{c}_M'$ from entangled light fields $\hat{a}_1', \ldots, \hat{a}_M'$, and each subsequent sub-circuit generates light fields $\hat{b}_m', \hat{c}_{m+1}' \ldots \hat{c}_M'$ from light fields $\hat{c}_m', \hat{c}_{m+1}' \ldots \hat{c}_M'$ outputted by a preceding sub-circuit. Light fields $\hat{b}_1', \hat{b}_2', \ldots \hat{b}_{M_P}'$ are detection light fields 492(1), 492(2), . . . , 492($M_P$). Light fields $\hat{b}_{M_P+1}', \ldots, \hat{b}_M'$ are auxiliary light fields 492($M_P$+1), . . . , 492(M). Light fields $\hat{a}_1', \ldots, \hat{a}_M'$ are probe light fields 490(1), . . . , 490(M). Each light field $\hat{c}_m'$ is an intermediate light field in the m'th channel of variational quantum circuit 420. In embodiments of PCA 400 implementing these $M_P$ sequential sub-circuits, training control module 440 may sequentially optimize each sub-circuit while leaving the preceding sub-circuit unchanged.

Each of variational quantum circuits 410 and 420 may be implemented as a network of beam splitters and phase shifters. In one implementation, each of variational quantum circuits 410 and 420 is a network of beam splitters and phase shifters as disclosed by Clements et al. in "Optimal design for universal multiport Interferometers", Optica, Vol. 3, No. 12, 2016, pp. 1460-1465.

Figure 5:
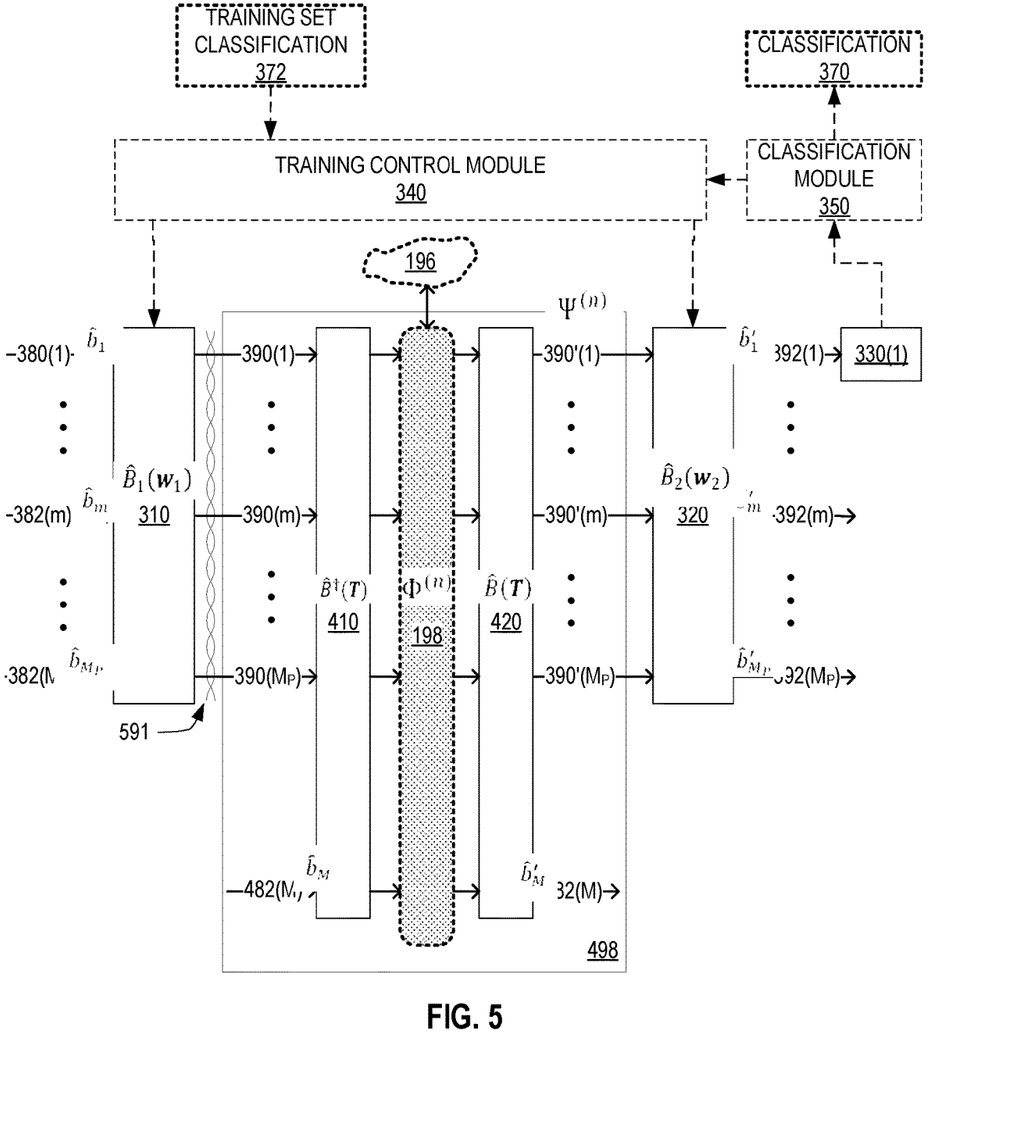
FIG. 5 illustrates a quantum-data-acquisition-based system that integrates an entanglement-enhanced SVM with an entanglement-enhanced PCA, according to an embodiment.

FIG. 5 illustrates one quantum-data-acquisition-based system 500 that integrates an entanglement-enhanced SVM with an entanglement-enhanced PCA. System 500 is an embodiment of system 100. System 500 is an extension of SVM 300 that further implements PCA 400. In system 500, SVM 300 is configured to probe an M-dimensional quantum channel $\Phi^{(n)}$. However, PCA 400 is inserted between variational quantum circuits 310 and 320 of SVM 300 to reduce M-dimensional quantum channel $\Phi^{(n)}$ to $M_P$-dimensional quantum channel $\Psi^{(n)}$. Here, entangled probe light fields 390(1), . . . , 390($M_P$) generated by variational quantum circuit 310 of SVM 300 serve as resource-squeezed vacuum states 480(1), . . . , 480($M_P$) to variational quantum circuit 410 of PCA 400, and detection light fields 492(1), . . . , 492($M_P$) outputted by variational quantum circuit 420 of PCA 400 effectively substitute probe light fields 390'(1), . . . , 390'($M_P$) processed by variational quantum circuit 320 of SVM 300. In one scenario, variational quantum circuits 410 and 420 of PCA 400 are first trained to optimally determine the $M_P$ principal components, whereafter variational quantum circuits 310 and 320 of SVM 300 are trained on the $M_P$-dimensional quantum channel $\Psi^{(n)}$ to optimally classify samples 196.

Figure 6:
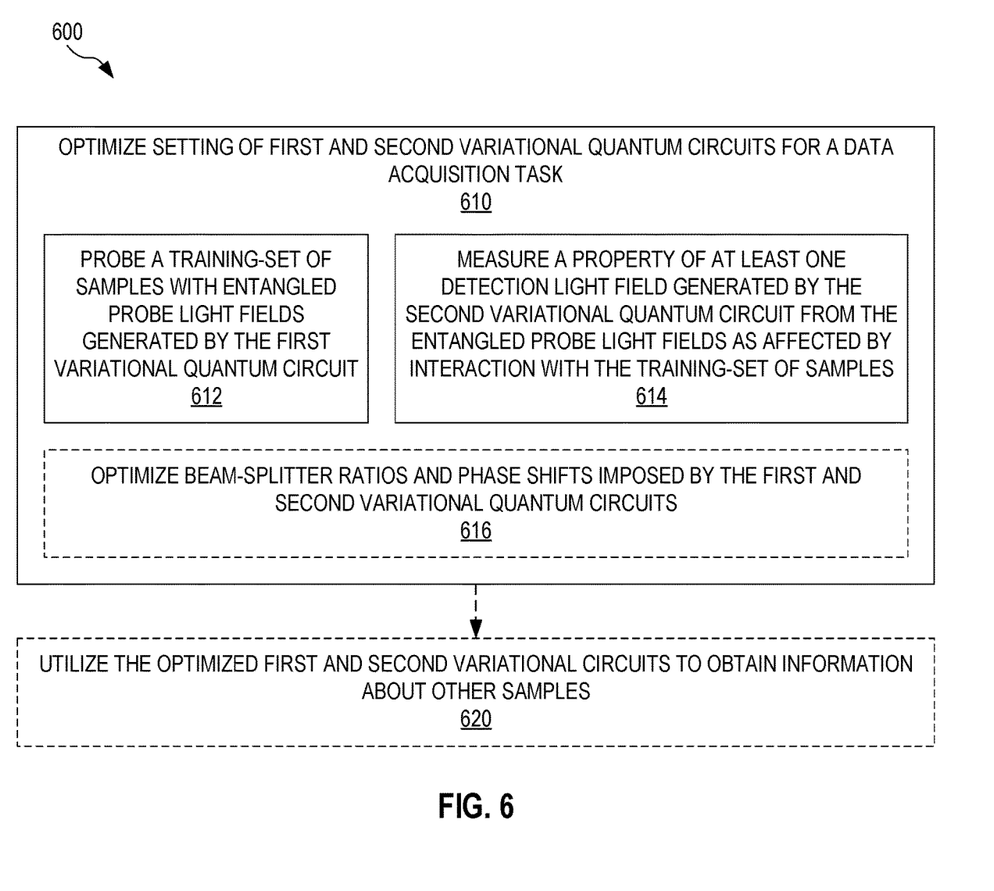
FIG. 6 illustrates a method for entanglement-enhanced machine learning with quantum data acquisition, according to an embodiment.

FIG. 6 illustrates one method 600 for entanglement-enhanced machine learning with quantum data acquisition. Method 600 may be performed by system 100. Method 600 includes a step 610 that optimizes the setting of first and second variational quantum circuits for a data acquisition task. Step 610 includes steps 612 and 614. Step 612 probes a training-set of samples with entangled probe light fields generated by the first variational quantum circuit. Step 614 measures a property of at least one detection light field generated by the second variational quantum circuit from the entangled probe light fields as affected by interaction with the training-set of samples. In one example of step 610, training control module 140 optimizes the setting of variational quantum circuits 110 and 120 by (a) in step 612, probing a training-set of samples with entangled probe light fields 190 generated by variational quantum circuit 110 and (b) in step 614, measuring a property of detection light field(s) 192 generated by variational quantum circuit 120 from probe light fields 190'.

Step 610 may further include a step of optimizing beam-splitter ratios and phase shifts imposed by the first and second variational quantum circuits, such as beam-splitter ratios and phase shifts imposed by embodiments of variational quantum circuits 110 and 120 based on beam splitters and phase shifters.

In an embodiment, method 600 is extended to further include a utilization step 620 that utilizes the first and second variational quantum circuits, as optimized in step 610, to obtain information about other samples. In one example of step 620, system 100 is, after completion of a training stage, used to obtain information about other samples whose properties are a priori unknown.

Figure 7:
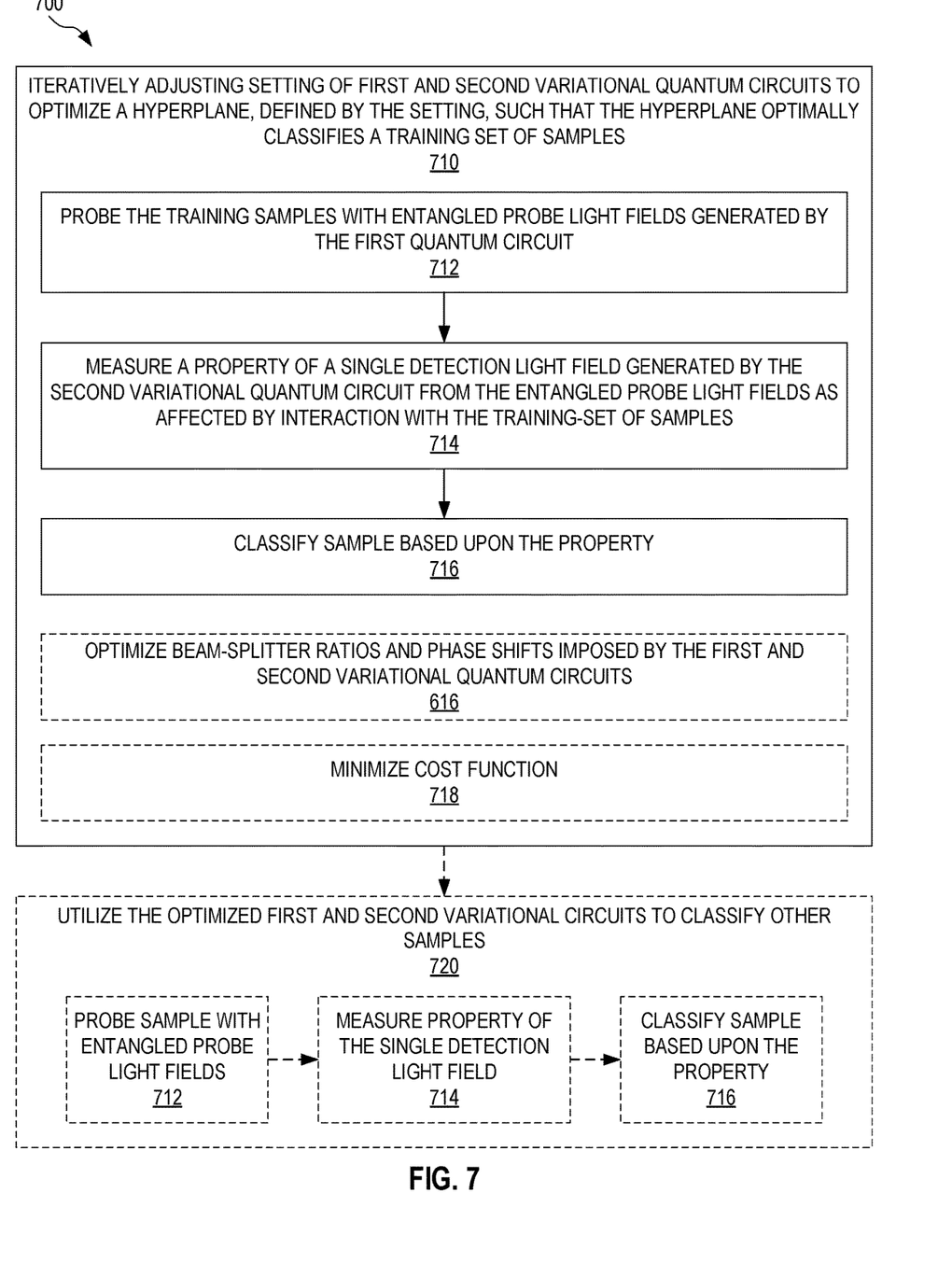
FIG. 7 illustrates a supervised learning method for training an entanglement-enhanced SVM with quantum data acquisition, according to an embodiment.

FIG. 7 illustrates one supervised learning method 700 for training an entanglement-enhanced SVM with quantum data acquisition. Method 700 is an embodiment of method 600 and may be performed by SVM 300. Method 700 includes a step 710 of iteratively adjusting the setting of first and second variational quantum circuits to optimize a hyperplane, defined by the setting, such that the hyperplane optimally classifies a training set of samples. Step 710 includes steps 712, 714, and 716. Step 712 probes the training samples with entangled probe light fields generated by the first quantum circuit. Step 714 measures a property of a single detection light field generated by the second variational quantum circuit from the entangled probe light fields as affected by interaction with the training-set of samples. Step 716 classifies sample based upon the property. Step 710 iterates between (a) steps 712, 714, and 716 and (b) adjusting the setting of the first and second variational quantum circuits. In one example of step 710, training control module 340 carries out a supervised learning process to optimize the setting of variational quantum circuits 310 and 320 for classification of samples 196. In this example, probe light fields 190 probe training samples 196 in step 712, detector 330(1) measures detection light field 392(1) in step 714, and classification module 350 classifies the samples in step 716 based upon the property measured in step 714.

Step 710 may implement step 616. Step 710 may further implement a step 718 of minimizing a cost function, for example the cost function discussed above in reference to FIG. 3, according to a simultaneous stochastic approximation algorithm, or another algorithm known in the art.

In an embodiment, method 700 is extended to further include a utilization step 720 that utilizes the first and second variational quantum circuits, as optimized in step 710, to classify other samples. In one example of step 720, SVM 300 is, after completion of a training stage, used to classify other samples whose classification is a priori unknown. Step 720 may include steps 712, 714, and 716, but applied to unknown samples.

Figure 8:
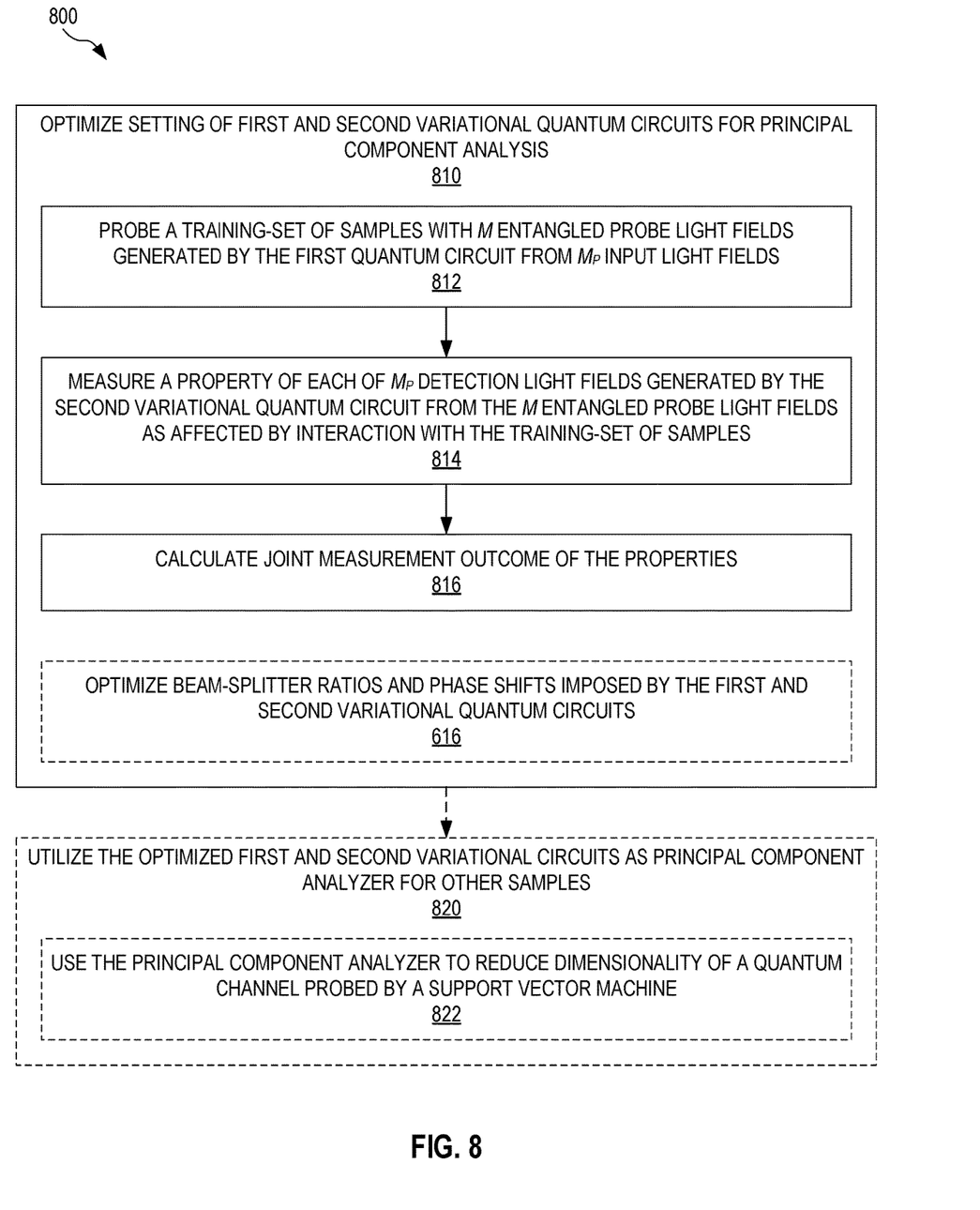
FIG. 8 illustrates an unsupervised learning method for training an entanglement-enhanced PCA with quantum data acquisition, according to an embodiment.

FIG. 8 illustrates one unsupervised learning method 800 for training an entanglement-enhanced PCA with quantum data acquisition. Method 800 is an embodiment of method 600 and may be performed by PCA 400. Method 800 includes a step 810 of optimizing the setting of first and second variational quantum circuits for principal component analysis. Step 810 includes steps 812, 814, and 816. Step 812 probes a training-set of samples with M entangled probe light fields generated by the first quantum circuit from $M_P$ input light fields. Step 814 measures a property of each of $M_P$ detection light fields generated by the second variational quantum circuit from the M entangled probe light fields as affected by interaction with the training-set of samples. Step 816 calculates a joint measurement outcome of the measured properties for each of the samples. In one example of step 810, training control module 440 carries out an unsupervised learning process, with a training sample set, to optimize the setting of variational quantum circuits 410 and 420 of PCA 400 for principal component analysis. In this example, probe light fields 190 probe training samples 196 in step 812, detectors 430(1), . . . , 430($M_P$) measure detection light fields 492(1), . . . , 492($M_P$) in step 814, and training control module 440 derives a joint measurement outcome in step 816 from the measurements obtained in step 814. Step 810 may implement step 616.

In an embodiment, method 800 is extended to further include a utilization step 820 that utilizes the first and second variational quantum circuits, as optimized in step 810, as a PCA for samples. In one example, step 820 includes a step 822 of using the PCA to reduce dimensionality of a quantum channel probed by an SVM, for example as discussed for system 500.

Further supporting information is attached hereto as Appendix I.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for entanglement-enhanced machine learning with quantum data acquisition, comprising:
   a first variational quantum circuit for generating a plurality of entangled probe light fields that interact with a sample;
   a second variational quantum circuit for processing the plurality of entangled probe light fields, after having interacted with the sample, to produce at least one detection light field; and
   at least one detector for measuring a property of the at least one detection light field;
   the first and second variational quantum circuits having a setting that is optimizable through machine learning to optimally acquire data about the sample.

2. The system of claim 1, further comprising a training control module for, while the plurality of entangled probe light fields interacts with a training-set of samples:
   varying the setting of the first and second variational quantum circuits; and
   evaluating corresponding measurements by the at least one detector in relation to the training-set of samples.

3. The system of claim 1, further comprising a post-processing module for processing a measurement outcome of the at least one detector to determine a property of the sample.

4. The system of claim 1, the first variational quantum circuit being configured to implement a unitary operation $\hat{B}^\dagger$ to generate the plurality of entangled probe light fields from one or more input light fields, the second variational quantum circuit being configured to implement a unitary operation $\hat{B}$ to generate the at least one detection light field from the plurality of entangled probe light fields as affected by interaction with the sample, $\hat{B}^\dagger$ being the Hermitian conjugate of $\hat{B}$.

5. The system of claim 1, each of the first and second variational quantum circuits comprising a network of one or more beam splitters, one or more phase shifters, or a combination of thereof.

6. The system of claim 1 being a quantum support-vector machine, the first variational quantum circuit being configured to impose a unitary operation $\hat{B}_1(w_1)$ on a squeezed vacuum state to generate the plurality of entangled probe light fields, the second variational quantum circuit being configured to impose a unitary operation $\hat{B}_2(w_2)$ on the plurality of entangled probe light fields, as affected by interaction with the sample, to generate a plurality of detection light fields, $\hat{B}_1(w_1)$ being different from the Hermitian conjugate of $\hat{B}_2(w_2)$, $w_1$ being a vector defined by the setting of the first variational quantum circuit, $w_2$ being a vector defined by the setting of the second variational quantum circuit.

7. The system of claim 1, wherein:
   the first variational quantum circuit is configured to impose a unitary operation $\hat{B}^\dagger(w)$ on a squeezed vacuum state to generate the plurality of entangled probe light fields;
   the second variational quantum circuit is configured to impose a unitary operation $\hat{B}(w)$ on the plurality of entangled probe light fields as affected by an interaction with the sample, to generate a single detection light field, $\hat{B}^\dagger(w)$ being the Hermitian conjugate of $\hat{B}(w)$, w being a vector defined by both the setting of the first variational quantum circuits;
   such that the system implements a support-vector machine.

8. The system of claim 6, wherein:
   the plurality of entangled probe light fields have $M_P$ entangled probe light fields; and
   the system further comprises:
      between the first and second variational quantum circuits, a quantum principal-component analyzer for reducing dimensionality of an M-dimensional quantum channel to $M_P$ principal components,
      such that the sample is interrogated by M entangled probe light fields while (a) the first variational quantum circuit of the quantum support-vector machine processes only $M_P$ entangled input probe light fields to the quantum principal-component analyzer and (b) the second variational quantum circuit of the quantum support-vector machine processes only $M_P$ entangled output probe light fields from the quantum principal-component analyzer, M and $M_P$ being integers and $M_P<M$.

9. The system of claim 8, the quantum principal-component analyzer including:
   a third quantum circuit configured to impose a unitary operation $\hat{B}^\dagger(T)$ on the $M_P$ entangled input probe light fields to generate the M entangled probe light fields; and
   a fourth variational quantum circuit configured to impose a unitary operation $\hat{B}(T)$ on the M entangled probe light fields, as affected by interaction with the sample, to generate the $M_P$ entangled output probe light fields, $\hat{B}^\dagger(T)$ being the Hermitian conjugate of $\hat{B}(T)$, T being a transformation defined by the third and fourth variational quantum circuits.

10. The system of claim 9, the at least one detector being a detector for measuring the single detection light field, the system further comprising $M_P$ detectors for measuring phase properties of the $M_P$ entangled output probe light fields to aid a machine learning process to optimize the third and fourth variational quantum circuits.

11. The system of claim 1, the first and second variational quantum circuits implementing a quantum principal-component analyzer for reducing dimensionality of an M-dimensional quantum channel to $M_P$ principal components, M and $M_P$ being integers, $M_P<M$, the plurality of entangled probe light fields being M entangled probe light fields, the first variational quantum circuit being configured to impose a unitary operation $\hat{B}^\dagger(T)$ on $M_P$ squeezed vacuum states to generate the M entangled probe light fields, the second variational quantum circuit being configured to impose a unitary operation $\hat{B}(T)$ on the M entangled probe light fields, as affected by interaction with the sample, to generate $M_P$ detection light fields, $\hat{B}^\dagger(T)$ being the Hermitian conjugate of $\hat{B}(T)$, T being a transformation defined by the setting of the first and second variational quantum circuits.

12. The system of claim 11, the first variational quantum circuit being configured to generate the plurality of entangled probe light fields as light fields $\hat{a}_1', \ldots, \hat{a}_M'$, the second variational quantum circuit being configured to generate detection light fields $\hat{b}_1', \ldots, \hat{b}_{M_P}'$ from the light fields $\hat{a}_1', \ldots, \hat{a}_M'$, as affected by interaction with the sample, the second variational quantum circuit including $M_P$ sequential sub-circuits configured to impose respective unitary transformations $\hat{B}(T_m)$, m=1, ..., $M_P$, a first one of the sub-circuits including a plurality of beam splitters and phase shifters for generating light fields $\hat{b}_1', \hat{c}_2', \ldots \hat{c}_M'$ from the entangled light fields $\hat{a}_1', \ldots, \hat{a}_M'$, each subsequent one of the sub-circuits including a plurality of beam splitters and phase shifters for generating light fields $\hat{b}_m', \hat{c}_{m+1}' \ldots \hat{c}_M'$ from light fields $\hat{c}_m', \hat{c}_{m+1}', \ldots \hat{c}_M'$ outputted by a preceding one of the sub-circuits.

13. The system of claim 1, further comprising a plurality of transducers configured to encode information from the sample into the plurality of entangled probe light fields, respectively.

14. A method for entanglement-enhanced machine learning with quantum data acquisition, comprising:
optimizing a setting of a first and second variational quantum circuits for a data acquisition task, said optimizing including:
probing a training-set of samples with a plurality of entangled probe light fields generated by the first variational quantum circuit; and
measuring a phase property of at least one detection light field generated by the second variational quantum circuit from the plurality of entangled probe light fields as affected by interaction with the training-set of samples.

15. The method of claim 14, said optimizing comprising optimizing beam-splitter ratios and phase shifts imposed by the first and second variational quantum circuits.

16. The method of claim 14,
the first and second variational quantum circuits forming a quantum support-vector machine, the second variational quantum circuit being configured to process the plurality of entangled probe light fields, after having interacted with the training set of samples, to produce a single detection light field;
the step of measuring comprising measuring a property of the single detection light field; and
the step of optimizing further comprising iteratively adjusting the setting of the first and second variational quantum circuits to optimize at least one hyperplane, defined by the setting of first and second variational quantum circuit, such that the at least one hyperplane results in the property optimally classifying the training-set of samples.

17. The method of claim 16, the steps of iteratively adjusting and classifying cooperate to minimize a cost function according to a simultaneous perturbation stochastic approximation algorithm.

18. The method of claim 16, further comprising, after the step of optimizing:
probing at least one sample with the plurality of entangled probe light fields;
measuring the property of the single detection light field; and
classifying the sample based at least in part on the property.

19. The method of claim 16, further comprising, with a quantum principal-component analyzer between the first and second variational quantum circuits, reducing dimensionality of a quantum channel from M entangled light fields to $M_P$ principal components, M and $M_P$ being integers, $M_P<M$.

20. The method of claim 19, further comprising, prior to the step of optimizing the setting of first and second variational quantum circuits of the support-vector machine, tuning a setting of a third and fourth variational quantum circuits of the quantum principal-component analyzer to optimize the $M_P$ principal components.

21. The method of claim 14,
the first and second variational quantum circuits forming a quantum principal-component analyzer, the first variational quantum circuit being configured to generate, from $M_P$ input light fields, M entangled probe light fields for interacting with a sample, the second variational quantum circuit being configured to process the M entangled probe light fields, after having been affected by interaction with the sample, to generate $M_P$ detection light fields, M and $M_P$ being integers, $M_P<M$;
the step of measuring comprising measuring a property of each of the $M_P$ detection light fields; and
the step of optimizing further comprising iteratively adjusting the setting of the first and second variational quantum circuits to maximize a joint measurement outcome of the properties measured for the $M_P$ detection light fields.

* * * * *